(12) United States Patent
Shaikh et al.

(10) Patent No.: US 10,681,059 B2
(45) Date of Patent: Jun. 9, 2020

(54) RELATING TO THE MONITORING OF NETWORK SECURITY

(71) Applicant: CyberOwl Limited, London (GB)

(72) Inventors: Siraj Ahmed Shaikh, Coventry (GB); Harsha Kumara Kalutarage, Belfast (GB)

(73) Assignee: CyberOwl Limited, London (GB)

( * ) Notice: Subject to any disclaimer, the term of this patent is extended or adjusted under 35 U.S.C. 154(b) by 97 days.

(21) Appl. No.: 15/164,035

(22) Filed: May 25, 2016

(65) Prior Publication Data
US 2017/0346834 A1 Nov. 30, 2017

(51) Int. Cl.
*H04L 29/06* (2006.01)

(52) U.S. Cl.
CPC .............................. *H04L 63/1416* (2013.01)

(58) Field of Classification Search
CPC ............ H04L 63/1408; H04L 63/1425; H04L 63/1416
USPC ........................................................ 726/23
See application file for complete search history.

(56) References Cited

U.S. PATENT DOCUMENTS

| | | | |
|---|---|---|---|
| 7,296,070 B2 | 11/2007 | Sweeney et al. | |
| 7,630,987 B1 * | 12/2009 | Renfro | H04L 63/1483 |
| 7,761,918 B2 | 7/2010 | Gula et al. | |
| 7,926,113 B1 | 4/2011 | Gula et al. | |
| 8,037,534 B2 | 10/2011 | Smith et al. | |
| 8,079,074 B2 | 12/2011 | Bahl et al. | |
| 8,087,061 B2 | 12/2011 | Jarrett | |
| 8,549,650 B2 | 10/2013 | Hanson | |
| 8,656,095 B2 | 2/2014 | Coulter | |
| 8,707,440 B2 | 4/2014 | Gula et al. | |
| 8,719,935 B2 | 5/2014 | Polyakov et al. | |
| 8,839,442 B2 | 9/2014 | Deraison | |
| 8,949,257 B2 | 2/2015 | Shiffer et al. | |
| 9,036,979 B2 | 5/2015 | Gharaat et al. | |

(Continued)

FOREIGN PATENT DOCUMENTS

| | | |
|---|---|---|
| WO | WO-2006119233 A2 | 11/2006 |
| WO | WO-2014039811 A1 | 3/2014 |

(Continued)

OTHER PUBLICATIONS

Shaikh et al., Effective Network Security Monitoring: from attribution to target-centric monitoring, Springer Science +Business Media New York 2015, pp. 1-12, Jun. 6, 2015.

*Primary Examiner* — Aravind K Moorthy
(74) *Attorney, Agent, or Firm* — Finch & Maloney PLLC

(57) ABSTRACT

The present invention provides a target centric monitoring of a network enabling a likelihood score for the existence of an attack to be calculated. The score is calculated by monitoring a plurality of network nodes for a range of symptoms. Detected symptoms are then profiled using a classical Bayesian-based framework such that a node score is calculated for every node. The node scores are compared against reference activity so as to identify deviations from reference activity. The reference activity may comprise peer analysis comparing the node scores against the nodes scores or per nodes and discord analysis comparing the node score of a particular node against historical behaviour. Based on the deviations, the method can enable the calculation of a likelihood of suspicious activity for each node.

12 Claims, 4 Drawing Sheets

(56) References Cited

U.S. PATENT DOCUMENTS

| | | |
|---|---|---|
| 9,071,535 B2 | 6/2015 | Chattopadhyay et al. |
| 9,158,919 B2 | 10/2015 | Fortier |
| 9,185,095 B1* | 11/2015 | Moritz ................. H04L 63/102 |
| 9,189,627 B1 | 11/2015 | Islam |
| 9,223,972 B1 | 12/2015 | Vincent et al. |
| 9,292,881 B2 | 3/2016 | Alperovitch et al. |
| 9,471,778 B1* | 10/2016 | Seo .................... H04L 63/1425 |
| 9,516,053 B1* | 12/2016 | Muddu ................. G06F 3/0482 |
| 10,021,120 B1* | 7/2018 | Salour ................. H04L 63/1416 |
| 10,419,450 B2* | 9/2019 | Muddu ................. H04L 43/062 |
| 2004/0042650 A1* | 3/2004 | Ii .......................... G06K 9/6228 |
| | | 382/158 |
| 2006/0161816 A1 | 7/2006 | Gula et al. |
| 2008/0215576 A1* | 9/2008 | Zhao ................ G06F 17/30702 |
| 2008/0320131 A1* | 12/2008 | Chalmers ................ H04L 41/12 |
| | | 709/224 |
| 2009/0064337 A1* | 3/2009 | Chien .................. G06F 21/564 |
| | | 726/25 |
| 2009/0328223 A1 | 12/2009 | Medvedev et al. |
| 2010/0287615 A1* | 11/2010 | Martin ............... H04L 63/1416 |
| | | 726/23 |
| 2011/0225022 A1* | 9/2011 | Handley ............ G06Q 10/0635 |
| | | 705/7.29 |
| 2011/0252032 A1 | 10/2011 | Fitzgerald et al. |
| 2012/0216282 A1* | 8/2012 | Pappu ................ H04L 63/1416 |
| | | 726/23 |
| 2012/0304288 A1* | 11/2012 | Wright ................. G06F 21/552 |
| | | 726/22 |
| 2013/0151692 A1* | 6/2013 | White .................. H04L 41/145 |
| | | 709/224 |
| 2013/0247185 A1 | 9/2013 | Viscuso et al. |
| 2013/0305371 A1 | 11/2013 | Figlin et al. |
| 2014/0016520 A1 | 1/2014 | Kim et al. |
| 2014/0189776 A1 | 7/2014 | Diehl |
| 2014/0215618 A1 | 7/2014 | Striem Amit |
| 2014/0237607 A1 | 8/2014 | Lambert et al. |
| 2014/0274130 A1* | 9/2014 | Venkatraman ........ G01S 5/0009 |
| | | 455/456.2 |
| 2014/0283050 A1 | 9/2014 | Striem Amit |
| 2014/0351415 A1 | 11/2014 | Harrigan et al. |
| 2014/0359694 A1 | 12/2014 | Maxwell et al. |
| 2015/0039751 A1 | 2/2015 | Harrigan et al. |
| 2015/0074806 A1* | 3/2015 | Roundy .................. G06F 21/55 |
| | | 726/23 |
| 2015/0096024 A1 | 4/2015 | Haq et al. |
| 2015/0096025 A1 | 4/2015 | Ismael |
| 2015/0101044 A1 | 4/2015 | Martin et al. |
| 2015/0180891 A1 | 6/2015 | Seward et al. |
| 2015/0212663 A1 | 7/2015 | Papale et al. |
| 2015/0222646 A1 | 8/2015 | Diehl et al. |
| 2015/0222655 A1 | 8/2015 | Gula et al. |
| 2015/0227741 A1 | 8/2015 | Permeh et al. |
| 2015/0229662 A1* | 8/2015 | Hitt ..................... H04L 63/1425 |
| | | 726/23 |
| 2015/0244679 A1 | 8/2015 | Diehl et al. |
| 2015/0264061 A1 | 9/2015 | Ibatullin et al. |
| 2015/0281259 A1 | 10/2015 | Ranum et al. |
| 2015/0295765 A1 | 10/2015 | Dickey |
| 2015/0295775 A1 | 10/2015 | Dickey |
| 2015/0339377 A1 | 11/2015 | Carasso et al. |
| 2015/0358344 A1 | 12/2015 | Mumcuoglu et al. |
| 2016/0004869 A1 | 1/2016 | Ismael et al. |
| 2016/0034555 A1 | 2/2016 | Rahut et al. |
| 2016/0092485 A1 | 3/2016 | Lamas et al. |
| 2016/0092558 A1 | 3/2016 | Ago et al. |
| 2016/0127180 A1 | 5/2016 | Shcherbakov et al. |
| 2016/0127401 A1 | 5/2016 | Chauhan et al. |
| 2016/0127402 A1* | 5/2016 | Veeramachaneni ......................... |
| | | H04L 63/1425 |
| | | 726/23 |
| 2016/0127517 A1 | 5/2016 | Shcherbakov et al. |
| 2016/0255104 A1* | 9/2016 | Eslambolchi ....... H04L 63/1416 |
| | | 726/23 |
| 2016/0294851 A1* | 10/2016 | Langton ............. H04L 63/1416 |
| 2016/0337391 A1* | 11/2016 | McKinney .......... H04L 63/1433 |
| 2016/0352765 A1* | 12/2016 | Mermoud ........... H04L 63/1425 |
| 2016/0366159 A1* | 12/2016 | Chiba ...................... G06F 21/55 |
| 2017/0031741 A1* | 2/2017 | Seigel ................... G06F 11/079 |
| 2017/0155570 A1* | 6/2017 | Maheshwari .......... H04L 43/50 |
| 2017/0193371 A1* | 7/2017 | Shen ........................ G06N 5/04 |
| 2017/0279827 A1* | 9/2017 | Savalle .................. H04L 67/02 |
| 2017/0339168 A1* | 11/2017 | Balabine ............. G06F 16/951 |

FOREIGN PATENT DOCUMENTS

| | | |
|---|---|---|
| WO | WO-2014105535 A1 | 7/2014 |
| WO | WO-2014137640 A1 | 9/2014 |
| WO | WO-2014145805 A1 | 9/2014 |
| WO | WO-2014172182 A1 | 10/2014 |
| WO | WO-2014209914 A1 | 12/2014 |
| WO | WO-2015017024 A1 | 2/2015 |
| WO | WO-2015084577 A1 | 6/2015 |
| WO | WO-2015117013 A1 | 8/2015 |
| WO | WO-2015138506 A1 | 9/2015 |
| WO | WO-2015187566 A1 | 12/2015 |
| WO | WO-2016004593 A1 | 1/2016 |
| WO | WO-2016020660 A1 | 2/2016 |
| WO | WO-2016073379 A2 | 5/2016 |
| WO | WO-2016073382 A1 | 5/2016 |

\* cited by examiner

US 10,681,059 B2

RELATING TO THE MONITORING OF NETWORK SECURITY

TECHNICAL FIELD OF THE INVENTION

The present invention relates to security of networks. In particular, the invention relates to monitoring networks and providing an early warning of security threats.

BACKGROUND TO THE INVENTION

Many systems in the modern world rely upon networks in order to operate. Accordingly maintaining the security of such networks in the face of security attacks is ever more crucial. As global networks scale up, in terms of traffic, volume and speed, effective attribution of attacks is increasingly difficult. The problem is due to a combination of several factors. A number of these factors are directly related to network scale in particular: the volume of data processed or network traffic monitored; the size of networks or systems generating such data or traffic; and the speed of at which data or traffic is generated. These factors are further confounded by the presence upon many networks of increasing volumes of non-productive traffic, which serves as noise.

In addition to the above factors, there is the continually growing scale of attack activity. Typically forms of attack on public networks include worms, large scale botnets, and probing. Accordingly, much attention is given to identifying the source of such attacks. This can potentially allow attacks to be attributed and actions taken to block either the attack in progress or future attack from the attributed source.

To help evade attribution, most modern attacks are multi-stage attacks, wherein an attacker manages to use a different machine to launch an attack on the final target. Typically, an attacker would first compromise an intermediary machine and set it up to attack the final target. In many instances there may be several such machines, with each being used to compromise another. Once a complex web of anonymous mechanisms is set up, the attacker can then use these machines for the final attack. Such is the appeal of this approach that several compromised machines are already controlled, commonly known as botnets, by botnet operators who lease out these machines in what has become an established trade in the cybercrime.

The use of multiple stages between attacker and target make it at least very difficult to conduct any reliable attribution. Traditional intrusion detection and prevention systems designed to detect and prevent malicious activity at source can struggle against multi-stage attacks of this type. Where the multi-stage attack is relatively stealthy using low level activity from multiple compromised machines, the attack activity can carry over an extended period of time.

It is therefore an object of the present invention to provide for improved warning of security threats which at least partly overcomes or alleviates some of the above issues.

SUMMARY OF THE INVENTION

According to a first aspect of the present invention there is provided a method of monitoring a network for security threats, the method comprising: monitoring the activity of a plurality of network nodes; calculating a node score for each monitored node based upon the monitored activity; comparing the node scores against reference activity; identifying deviations from reference activity; and calculating a node suspicion score representing the likelihood of suspicious activity for each node based upon the identified deviations.

In the present invention, potential network security issues are thus detected by target centred monitoring of interfaces or nodes. This allows for effective detection of multi-stage or stealthy attacks and provides a readily scalable methodology.

The network nodes may comprise any hardware or software interface within the network. In this context, a hardware or software interface may comprise any point at which data is generated, collected or observed. The network nodes may comprise any network point having an address. Such addresses may be IP address or similar. Such addresses may identify particular machines or devices connected to the network.

Monitoring network node activity may comprise measuring particular parameters or actions associated with each node. Measured actions or parameters may include but are not limited to any one or more of: network traffic, system logs, web browser logs, network topology, and alerts generated by bespoke sensors.

The calculation of a node score may involve calculating a weighted sum of attack symptoms observed within a monitoring time window. Attack symptoms may comprise events include but are not limited to any one or more of: unauthorised service or file access attempts, large upload or download of data across links, and encrypted communication attempts from unexpected nodes. Observed attack symptoms may be allocated a weighting based upon severity. In this manner the node score provides a likelihood that a node is the victim of attack during the monitoring time window.

The reference activity may be an activity profile of peer nodes. In such implementations, comparing the node score against the peer profile may generate a peer anomaly score. Identifying deviations from peer behaviour provides a more accurate indication of aberrant behaviour than considering deviations from a universal node profile, which is very difficult to define due to the continuous change of baseline behaviour. The peer nodes may comprise nodes of a similar type or may comprise nodes of historically similar activity profiles.

The peer node profile may be based on the measured activity of said peer nodes. The peer node profile may be calculated from a mean of the node scores of the selected peer nodes. In such implementations, generating the peer anomaly score may comprise calculating the difference between the node score for each node and the mean of node scores of the selected nodes relative to the standard deviation of the node scores of the selected nodes.

In some implementations, the peer node profile may be calculated from a mean of a cumulative sum of node scores for each of the selected peer nodes. In such implementations, generating the peer anomaly score may comprise calculating the difference between the cumulative node score for each node and the mean of cumulative node scores of the selected nodes relative to the standard deviation of the cumulative node scores of the selected nodes.

The reference activity may be a profile based on historical activity of the monitored node. In such implementations, comparing the node score against the historical profile may generate a discord anomaly score.

The reference activity profile may be calculated from the historical activity of the node during a historical time window. In one implementation, the historical time window is the period immediately preceding an observation of the node. The calculation of the reference profile from the historical activity of the monitored node may comprise developing a historical model of node scores during the historical time window. The historical model may be based upon a moving average. In particular, the historical model may be based upon an autoregressive integrated moving average (ARIMA) model. Such a model may be based upon autocorrelations in the node score data. In one implementation, the historical model is used to predict a 95% confidence interval (CI) for the node score at a time t.

In such implementations, generating the discord anomaly score may comprise calculating whether the node score at a particular time falls within the CI. In the event that the node score at the particular time does not fall within the CI, the comparison may comprise calculating the absolute deviation of the node score from the CI. The discord anomaly score may be calculated from the average of the absolute deviation of the node score from the CI.

Calculating the node suspicion score for a particular node may involve summing the node scores. In one embodiment, calculating the likelihood of suspicious activity may comprise calculating a weighted sum of node scores. In another embodiment, calculating the likelihood of suspicious activity may comprise calculating a weighted sum of node anomaly scores. Such anomaly scores may include the peer anomaly score and the discord anomaly score.

The method may further include testing a node suspicion score to determine whether or not a node suspicion score indicates that an attack on the node is underway. In such circumstances an alarm may be output. The testing may comprise determining that the node suspicion score is a statistical outlier. The determination may be on the basis of a test such as the Grubbs test for outlier detection.

According to a second aspect of the invention there is provided a network monitored according to the method of the first aspect of the present invention.

The network of the second aspect of the present invention may comprise any or all features of the method of the first aspect of the present invention as desired or as appropriate.

DETAILED DESCRIPTION OF THE INVENTION

In order that the invention may be more clearly understood an embodiment thereof will now be described, by way of example only, with reference to the accompanying drawings, of which:

Figure 1:
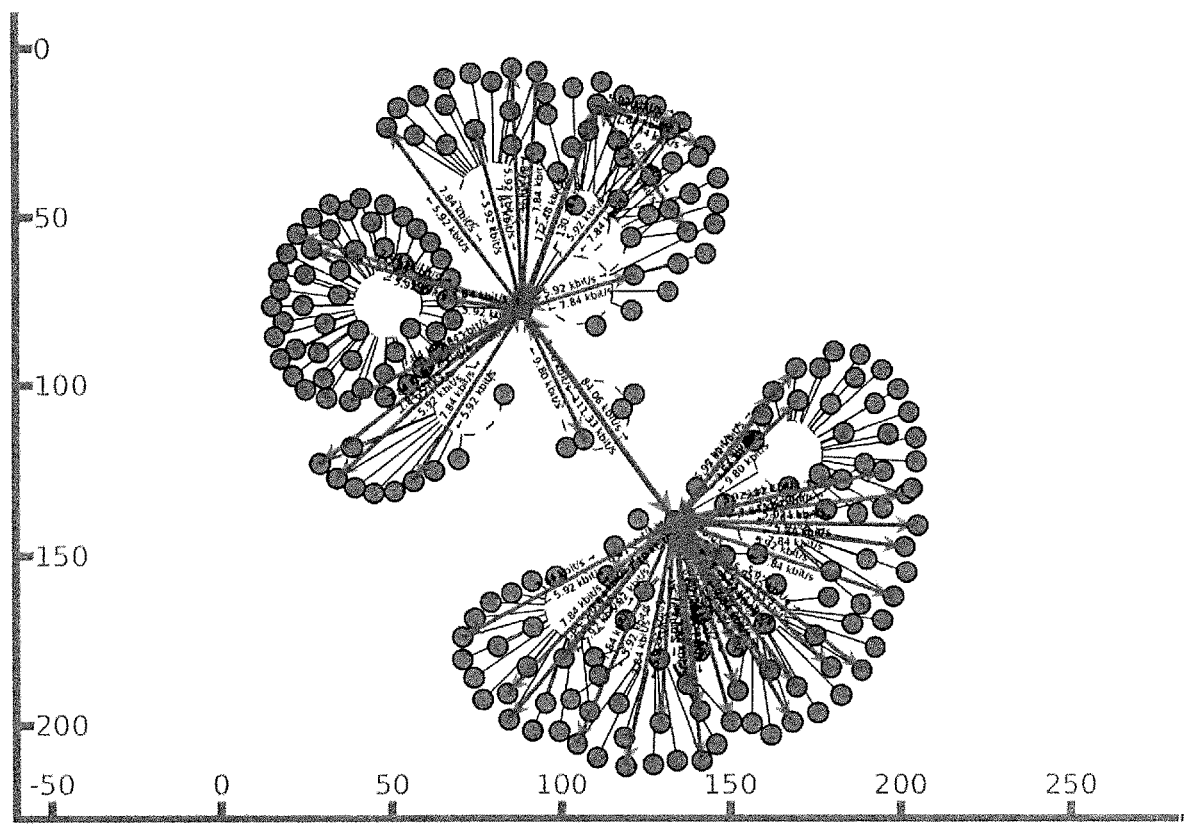
FIG. 1 is a schematic illustration of a simulated network upon which the method of the present invention is applied to detect attacks.

The present invention provides a target centric monitoring of a network. The monitoring enables a likelihood score for the existence of an attack to be calculated. The score is calculated by monitoring a plurality, typically substantially all, network nodes for a range of symptoms. In this context network nodes include hardware or software system interfaces (any point at which data is generated, collected or observed) or addresses (such as an IP address).

The monitored symptoms may include any mix of:
atomic, which are predefined and absolute values;
computed, which are obtained through other sources such as IDS or other similar security sensors; and
behavioural, which are essentially patterns of values over a well-defined time interval for observation.

Such symptoms are then profiled using a classical Bayesian-based framework such that a node score is calculated for every node. This node score can be updated every time the symptoms are observed. The node scores are compared against reference activity so as to identify deviations from reference activity. The reference activity may comprise peer analysis comparing the node scores against the nodes scores or per nodes and discord analysis comparing the node score of a particular node against historical behaviour. Based on the deviations, the method can enable the calculation of a likelihood of suspicious activity for each node.

The hypothesis to compute the score is as follows. Let $E=\{e_1, e_2, e_3, \ldots, e_m\}$ be the set of all symptoms observed against node k from m different independent observation spaces. $H_k$ is the hypothesis that $k^{th}$ node being a victim of attacker(s). $\neg H_k$ is the negation of $H_k$. Using the well-known Bayesian formula, $$P(H_k/E) = \frac{\prod_{j=1}^{m} p(e_j/H_k) \cdot p(H_k)}{\prod_{j=1}^{m} p(e_j/H_k) \cdot p(H_k) + \prod_{j=1}^{m} p(e_j/\neg H_k) \cdot p(\neg H_k)}$$

Let $w_{t_k}$ is the node score for a smaller time window w at time t and $w_{t_k} = P(H_k/E)$ Once the likelihood $p(e_j/H_k)$ and the prior $p(H_i)$ are known $P(H_k/E)$ can be calculated. For a given monitoring time window w at time t an individual node score $w_{t_k} = P(H_k/E)$ can be calculated. Node scores $w_{t_k}$ are updated at the end of each monitoring period w by considering all the evidence observed during that period.

This method advantageously combines information gathered from different sources into a single score for a minimum computational cost. It reduces data into a single value which is important to maintain information about node activities. The present method is also readily extended to a very large scale attack surface by adding a new indicator (attack vector) in E.

The use of the Bayesian-based framework provides for each symptom to be aggregated as a probability; this reflects on the weight carried by each symptom and avoids a simple count. In particular, the node scores, $w_{t_k} = P(H_k/E)$, can be accumulated over time to generate node suspicion scores. The node suspicion scores can be used to distinguish potential victim nodes from other nodes.

Early warnings of malicious activity targeting monitored nodes are detected by identifying anomalous node scores in a given set of nodes. Anomalous node scores are detected by comparing the node scores against reference activity. In the preferred implementation of the present invention two techniques are used: Peer analysis and Discord analysis. Peer analysis looks for node scores that deviate from the behaviour of a selected peer group of nodes. Discord analysis looks for node scores that deviate from historical behaviour of said node, and compares such deviation across the peer space.

Both peer analysis and discord analysis acknowledge the fact that baseline behaviour on networks is not necessarily stable. In implementations using both analysis techniques, the results of both above are fused such that each is proportionally represented as desired by the configuration.

In conducting peer analysis, the node score can be compared against the mean and standard deviation of node scores from the selected group of peer nodes to generate a peer anomaly score. This comparison can be conducted upon the basis of the node score $w_{t_k}$ for a specific period to provide an indication of the level of risk for a single node within the monitored time period. However, aggregating short period estimations over time allows relatively weak evidence persisting for long periods to provide an indication of ongoing low level attacks. In order to take advantage of this factor, the cumulative node score is used in calculating the peer anomaly score.

The cumulative node score of $k^{th}$ node at time t is $r_{t_k}$. The cumulative node score $r_{t_k}$ is related to the node score $w_{t_k}$ for a specific period by:

$$r_{t_k} = w_{t_k} + r_{(t-1)_k}$$

The peer anomaly score of node k at time t is $z_{t_k}$ which is calculated by:

$$z_{t_k} = \frac{r_{t_k} - \bar{r}_t}{\sigma_{r_t}},$$

where $\bar{r}_t$ are $\sigma_{r_t}$ mean and standard deviation of the selected peer group node scores.

In conducting discord analysis, the node score can be compared against historical activity of the node within a historical time window. The objective of the discord analysis is to detect sub-sequences, within a given sequence of profiles, which are anomalous with respect to the rest of the sequence. A model is learned from data in the historical time window, which can predict the expected behaviour of the node with respect to the learned context. If the expected behaviour significantly deviates from observed behaviour, an anomaly is declared.

This is achieved as follows. At the $(t-1)^{th}$ time point, using an autoregressive integrated moving average model ARIMA(p, d, q), which describes the autocorrelations in the data, 95% Confidence Interval (CI) for the $t^{th}$ node score is predicted. If the observed node score at time t lies outside of the predicted CI then absolute deviation of the node score from CI is calculated. This deviation is used as a measure of non-conformity of a given node score to the pattern of its own sequence (group norms). These deviations are then averaged over time to calculate the average dissimilarity score $s_{t_k}$ of node k at time t, being the average dissimilarity of node scores with its own profile sequence of node scores. This dissimilarity may occur randomly from time to time due to the deliberate intervention of an attacker. Subsequently, the discord anomaly score $d_{t_k}$ of node k at time t can be calculated from $$d_{t_k} = \frac{s_{t_k} - \bar{s}_t}{\sigma_{s_t}}$$

where $\bar{s}_t$ and $\sigma_{s_t}$ are mean and standard deviation of average dissimilarity scores.

To provide an overall assessment of the likelihood of an attack, both peer anomaly scores and discord anomaly scores can be used to calculate the node suspicion score. This thereby provides for monitoring of both deviation from longitudinal and lateral trends observed for potential targets.

In order to calculate the node suspicion score, $f_{t_k}$ of node k at time t, peer anomaly scores and discord anomaly scores can be fused with non-negative weights $\Delta_p$ and $\Delta_d$ as follows:

$$f_{t_k} = \frac{\Delta_p \cdot z_{t_k} + \Delta_d \cdot d_{t_k}}{\Delta_p + \Delta_d}$$

In order to determine whether an attack on node k is underway, suitable statistical testing may be applied to node k. If the testing indicates that an attack is likely to be underway, an alarm can be generated.

In one implementation, the Grubbs test for outlier detection may be applied to the node suspicion score, $f_{t_k}$ to determine whether an alarm should be raised. In particular if:

$$f_{t_k} \geq \frac{N-1}{\sqrt{N}} \sqrt{\frac{t^2_{\alpha/N, N-2}}{N - 2 + t^2_{\alpha/N, N-2}}}$$

then an alarm is raised. Here N is the number of node points in the set of monitored nodes, and $t_{\alpha/N,N-2}$ is the value taken by a t-distribution (one tailed test) at the significance level of $\alpha/N$. The $\alpha$ reflects the confidence associated with the threshold and indirectly controls the number of nodes declared as anomalous.

Turning now to FIG. 1, a network is simulated using the network simulator ns-3. Poison arrival model was assumed to generate traffic patterns of interest. The simulation was run for a period of time to ensure that enough traffic was generated.

The simulated network has ten subnets varying the size between 50 and 2, and any node is free to communicate with any other. Three attackers $A_1$, $A_2$, $A_3$ are planted in three subnets sizes 10, 25 and 50 respectively. In the simulation all three attackers may launch attacks on two targets $V_1$ and $V_2$ in a given server farm. Anomalous traffic by means of unusual port numbers was generated in addition to generating usual traffic within and between subnets and to external networks. The mean rates of generating suspicious events by suspicious and normal nodes (i.e. the noise) are represented by $\lambda s$, $\lambda n$ respectively. In the simulation, $\lambda s = \lambda n \pm 3\sqrt{\lambda n}$ and $\lambda n$ ($\leq 0.1$), in order to keep them suspicious activities within the normality range of innocent activities (i.e., background noise) and thereby simulate a stealthy attack.

Given the set up of potential attackers and potential victims in the simulated networks it is possible to simulate the following attack cases:
  One to one (1:1)—one attacker sends suspicious packets to only one target in the system
  One to Many (1:M)—three attackers send suspicious packets to only one target in the system
  Many to one (M:1)—one attacker sends suspicious packets to only two targets
  Many to many (N:M)—three attackers send suspicious packets to only two targets In particular, the M:N and 1:M cases are of importance as these simulate stealthy or distributed activities which may take place at a slow rate and are difficult to detect using source centric monitoring techniques.

Figure 2:
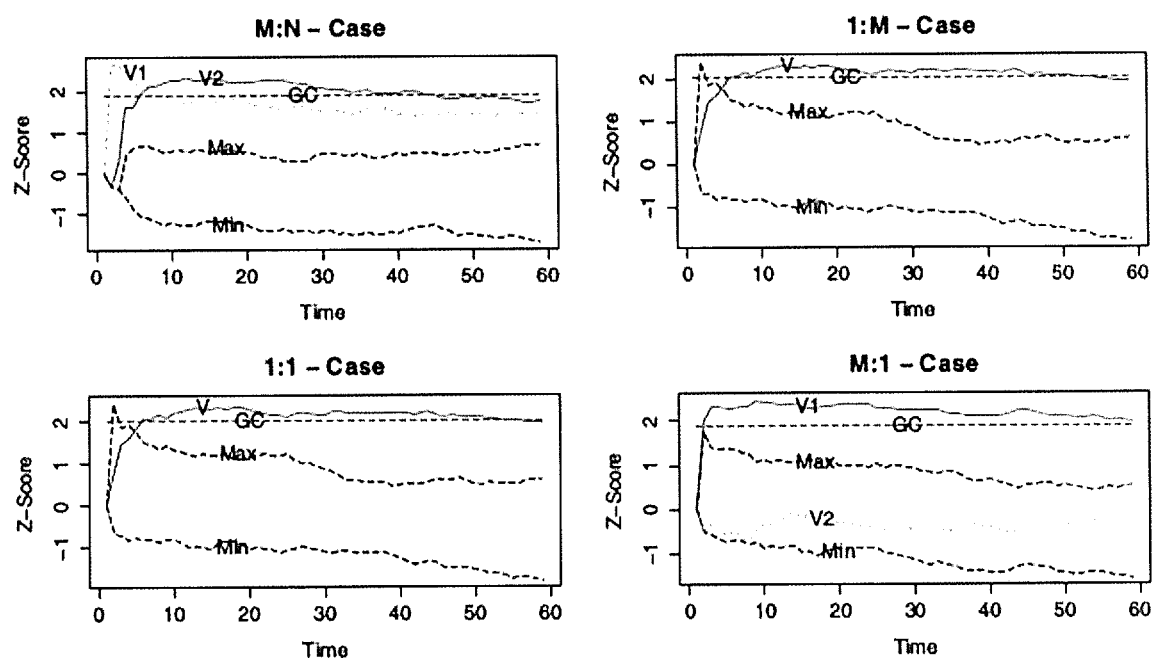
FIG. 2 is a series of charts illustrating the prospect of detecting attacks over time in various cases using the method of the present invention by monitoring the potential targets of any attacks.

Turning now to FIG. 2, the charts illustrate target centric monitoring outcomes using the present invention. In the charts, Min and Max represent the minimum and maximum node suspicion scores of normal nodes in each subnet where target node (node suspicion score denoted by V or V$i$ in graphs) is located. GC represents the Grubbs' critical value (threshold) for targets' subnet (i.e., the server farm). As is illustrated in FIG. 2, the method of the present invention is capable of detecting targets of attack activities successfully in all four cases. While the node suspicion score of the target is cut-off (or very close to) the threshold (GC), the node suspicion scores of all other normal nodes in the target's subnet are significantly below the threshold during the monitoring period.

In the M:1 case, only the node suspicion score of $V_1$ is above the threshold whilst node suspicion score of $V_2$ falls within the normal range. Nevertheless, once the attack on $V_1$ is detected, the case can be effectively turned into a 1:1 case and the attack on $V_2$ can then be rapidly uncovered.

Figure 3:
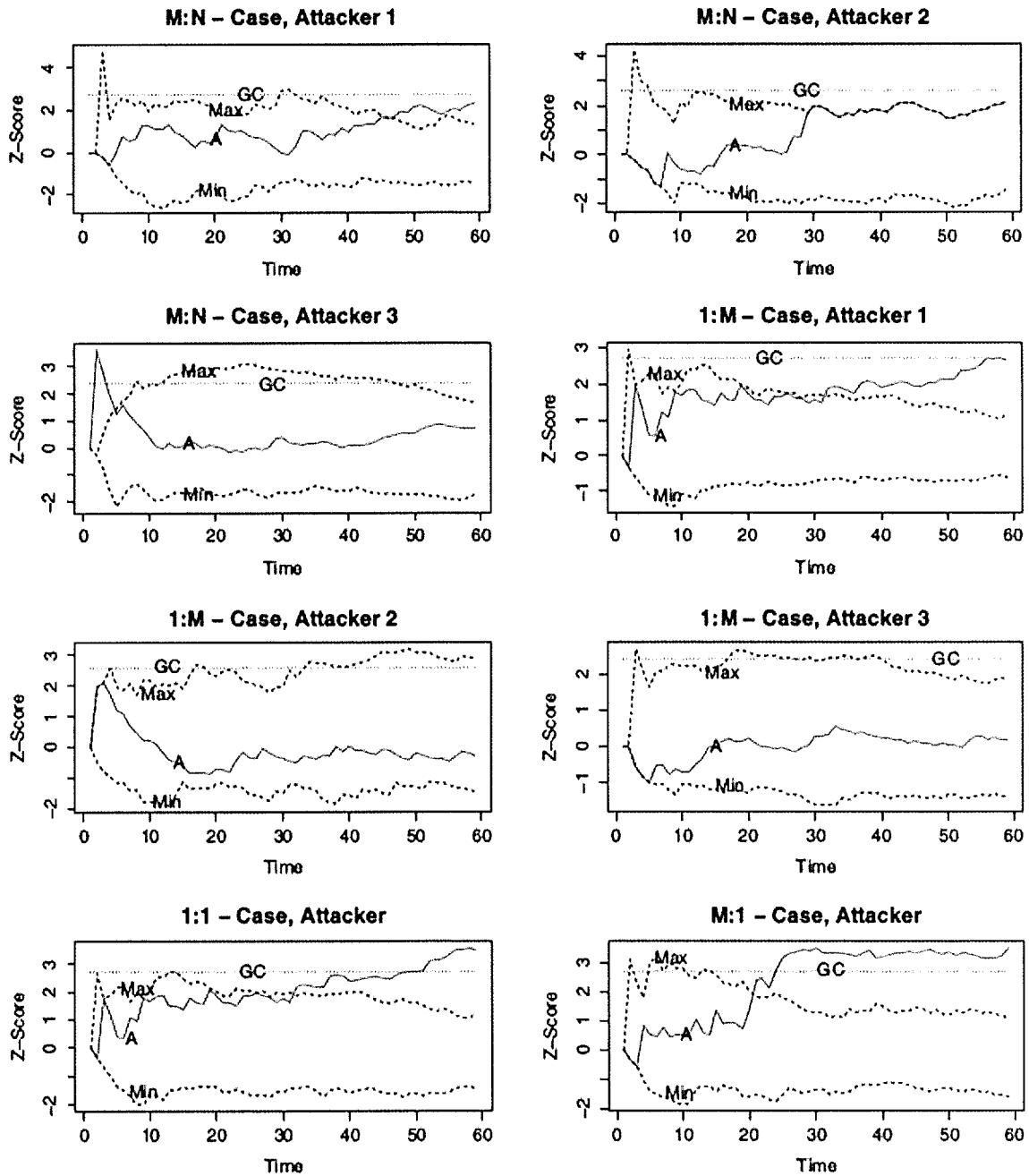
FIG. 3 is a series of charts illustrating the prospect of detecting attacks over time in various cases by monitoring the potential sources of any attacks.

Turning now to FIG. 3, the charts illustrate source centric monitoring outcomes using the same simulated network and attack cases. In FIG. 3, Min and Max represent the minimum and maximum profile scores of normal nodes in each subnets where attack node ($A_i$) is located. GC represents the Grubbs' critical value (threshold) for the attacker's subnet. FIG. 3 thus illustrates the increased time required to detect attacks using source centre monitoring or indeed the difficulty of making any detection in some cases.

Figure 4:
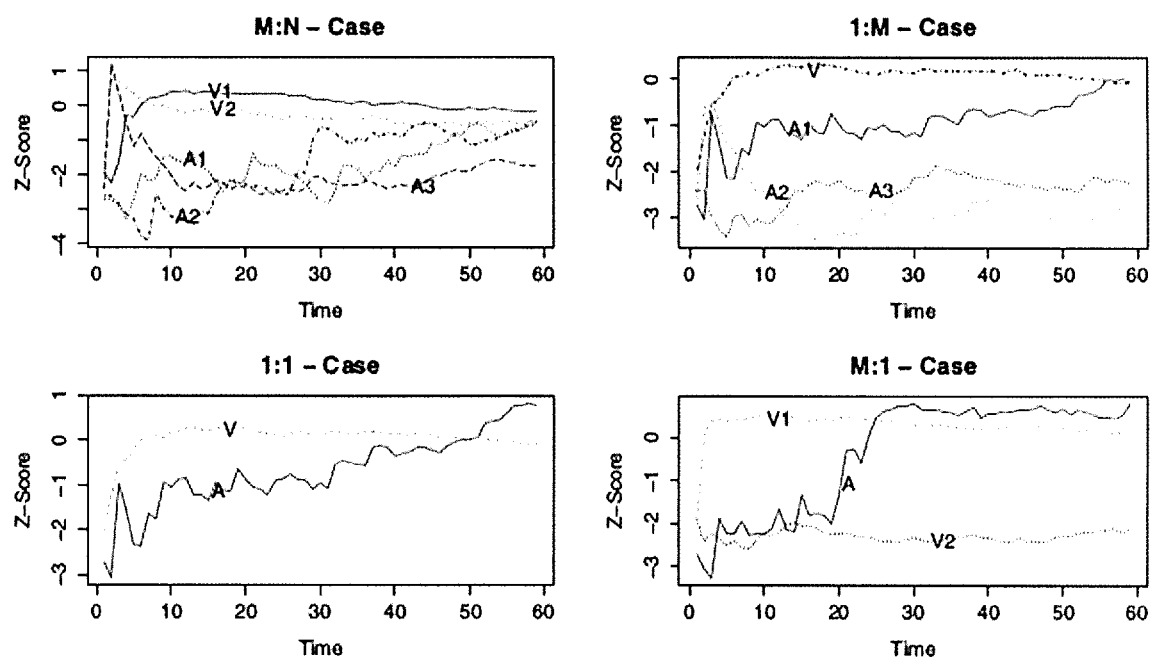
FIG. 4 is a comparison of the relative detection potentials illustrated in FIGS. 2 and 3 for each case.

The above finding is further illustrated in FIG. 4 which compares the detection potential for each above attack case using the target centric monitoring method of the present invention as opposed to source centric monitoring. The detection potential for each node $V_i$, $A_i$ is defined as the node suspicion score minus the Grubbs critical value threshold (GC).

As is illustrated in FIG. 4, the target-centric approach of the present invention has a higher detection potential in all four cases, with caveat discussed in relation to FIG. 2 for the M:1 case. This means that there is a higher chance of detection of suspicious activities than using traditional source centric approaches. Additionally, the detection potential of the source centric approach has higher fluctuations while detection potential of the present target oriented approach is more stable.

The above embodiment is described by way of example only. Many variations are possible without departing from the scope of the invention as defined in the appended claims.

The invention claimed is:

1. A method of monitoring a network and its nodes for security threats, the method comprising:
    monitoring the activity of a plurality of network nodes by measuring parameters and/or actions associated with each network node;
    calculating a plurality of node scores for each of the network nodes based upon the measured parameters and/or actions;
    comparing the calculated one or more node scores against a reference activity, the reference activity including both of
        a peer node score indicative of the monitored activity of a peer node having a similar type as the respective network node, and
        a network node score indicative of the monitored activity of a network node having a historically similar activity profile as the respective network node;
    calculating a node suspicion score representing the likelihood of suspicious activity for the one or more network nodes based upon the comparison, wherein the node suspicion score for a particular network node includes a weighted sum of
        a) a peer anomaly score representing a difference between a cumulative peer node score for an individual network node over time and a mean of cumulative peer node scores for all of the network nodes, the difference then divided by a standard deviation of the cumulative peer node scores for all of the network nodes, and
        b) a discord anomaly score representing a difference between an average of the network node scores for the individual network node over time and a mean of the average network node scores for all of the network nodes, the difference then divided by a standard deviation of the average network node scores for all of the network nodes; and
    applying a Grubbs test to determine whether the node suspicion score is a statistical outlier.

2. The method of claim 1, wherein the one or more network nodes include a hardware or software interface within the network at which data is generated, collected, or observed, or any network point having an address.

3. The method of claim 1, wherein monitoring the activity of one or more network nodes includes determining if an event is relevant.

4. The method of claim 1, wherein calculating one or more node scores for each of the one or more network nodes is based upon the monitored activity observed within a monitoring time window.

5. The method of claim 4, wherein calculating one or more node scores includes calculating a weighted sum of attack symptoms observed within the monitoring time window.

6. The method of claim 1, wherein the reference activity includes an activity profile of peer nodes.

7. The method of claim 1, wherein the reference activity includes a mean of peer group node scores.

8. The method of claim 1, wherein the reference activity is calculated from historical activity of the monitored network node during a historical time window by developing a historical model of the node scores during the historical time window.

9. The method of claim 8, wherein the historical model is based upon an autoregressive integrated moving average (ARIMA) model.

10. The method of claim 9, wherein generating the discord anomaly score includes determining whether the node score at a particular time falls within a 95% confidence interval (CI) of the historical model; and in the event that the node score at the particular time does not fall within the CI, calculating the absolute deviation of the node score from the CI.

11. The method of claim 10, wherein the discord anomaly score is calculated from the average of the absolute deviation of the node score from the CI.

12. The method of claim 1, wherein the node suspicion score is tested to determine whether or not the node suspicion score indicates that an attack on one or more of the network nodes is underway.

* * * * *